United States Patent [19]

Shaughnessy et al.

[11] Patent Number: 5,075,787
[45] Date of Patent: Dec. 24, 1991

[54] REPRODUCTION APPARATUS AND METHOD WITH ALPHANUMERIC CHARACTER-CODED HIGHLIGHTING FOR SELECTIVE EDITING

[75] Inventors: Marilina R. Shaughnessy; Roger E. Button, both of Rochester; Glenn R. Hyde, Churchville, all of N.Y.

[73] Assignee: Eastman Kodak Company, Rochester, N.Y.

[21] Appl. No.: 407,183

[22] Filed: Sep. 14, 1989

[51] Int. Cl.$^5$ .............................................. H04N 1/40
[52] U.S. Cl. .................................... 358/452; 358/448; 358/453; 358/470
[58] Field of Search ................ 355/218, 328; 358/401, 358/447, 448, 452, 453, 462, 464, 467, 470; 382/61, 9

[56] References Cited

U.S. PATENT DOCUMENTS

| | | | |
|---|---|---|---|
| 3,914,043 | 10/1975 | McVeigh | 355/4 |
| 4,538,182 | 8/1985 | Saito et al. | 358/80 |
| 4,558,374 | 12/1985 | Kurata et al. | 358/453 |
| 4,644,392 | 2/1987 | Yamada | 358/456 |
| 4,760,606 | 7/1988 | Lesnick et al. | 382/48 |
| 4,777,510 | 10/1988 | Russel | 355/4 |
| 4,896,208 | 12/1987 | Moriya et al. | 358/450 |
| 4,972,228 | 11/1990 | Stubler | 355/218 |
| 4,975,348 | 12/1990 | Tabuchi et al. | 355/218 |

Primary Examiner—Jin F. Ng
Assistant Examiner—Jerome Grant, II
Attorney, Agent, or Firm—Warren W. Kurz

[57] ABSTRACT

Apparatus and method for producing selectively edited reproductions of an original document wherein areas of information on the original are bounded and alphanumerically character-coded with the use of a highlighting means to designate the area for editing. The highlighted originals are serially passed during a copy run over an image scanner that is sensitive to the highlighted portions. The selected areas and the character codes are recognized and the image information is stored in a bit map. In one embodiment an original is imaged onto two image frames of an electrostatically-charged image-bearing member. Character recognition of the character codes allows the selected areas to be deleted, repositioned, selectively screened, or filled with a screen tint. Combinations of modalities may be indicated using appropriate combinations of character codes. The image frames are developed and transferred in register to a copy sheet to provide a reproduction according to the treatment mode indicated. In another embodiment the information is electronically scanned onto the image-bearing member using an LED or laser light source and the appropriate image frames exposed in accordance with the highlighting on the documents.

43 Claims, 12 Drawing Sheets

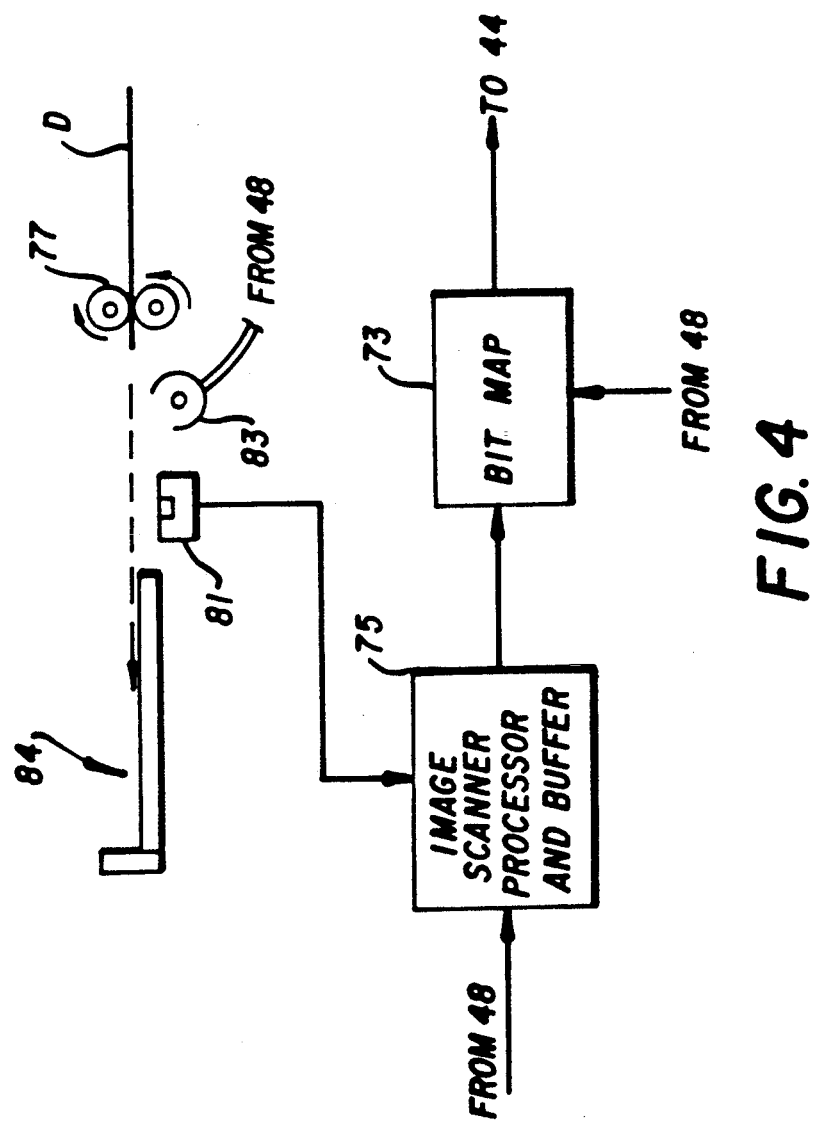

REPRODUCTION APPARATUS AND METHOD WITH ALPHANUMERIC CHARACTER-CODED HIGHLIGHTING FOR SELECTIVE EDITING

CROSS REFERENCE TO RELATED APPLICATION

This application is related to U.S. application Ser. No. 07/407,510, filed on even date herewith in the name of Yee S. Ng. et al. and entitled Method and Apparatus for Highlighting Nested Areas for Selective Editing.

BACKGROUND OF THE INVENTION

1. Field of the Invention

The present invention relates to electrophotographic reproduction apparatus and methods and, more specifically, to improvements in specifying color accenting or other special treatment modes for selective editing in the reproduction of an original document.

2. Brief Description of the Prior Art

In U.S. Pat. No. 3,914,043 an apparatus for electrophotographically reproducing originals with color accenting is described. An original document is placed on a support and indicator members adjacent the support are adjusted to designate the location of areas to be reproduced in one of two colors. The original is exposed onto a photoconductive drum and the image lines that are to be reproduced in the second color are erased and the remaining image is developed with toner of the first color color. A second exposure of the original is made on the photoconductor and the image lines that are to be reproduced in the first color are erased and the remaining image is developed with toner of the second color. The two developed images are transferred in register to a copy sheet to provide the reproduction.

However, as the indicator members are co-located with the support and the original, adjustments must be made while the original is mounted on the copying machine. It is desirable to eliminate this requirement. Further, such use of movable indicators is a tedious and painstaking effort.

In U.S. Pat. No. 4,558,374 (Kurata et al), a picture data processing device is disclosed wherein edited reproductions of an original are made by reproducing or extracting only a selected portion of an original. A separate sheet, referred to as a mark specifying original, is employed to draw lines comprising boundaries for the extracted portion. The mark specifying original is sensed by an image sensor and count value signals are stored that are related to these boundary lines. The document sheet is then read by the image sensor. The data signal used to reproduce the original is inhibited by these signals except for the region which is to be extracted. However, productivity is substantially lowered by the time and effort spent on preparing and using the mark specifying original with each original. When a multisheet document is to be reproduced with selective editing desired for several sheets in the document, the use of extra mark specifying sheets requires an inconvenient, time-consuming step: the sheets must be identified by interleaving or sequencing them with their respective originals.

In U.S. Pat. No. 4,538,182 (Saito et al.), an image processing apparatus has CCDs for reading image data of an original, an edge detector for detecting edges of an area specified on the original with a loop or marks of a specific color, and an area detector for detecting the specified area. Memories store the image data read by the CCDs and a data selector and a data switching circuit select the image data read by one of the CCDs which is to be supplied to an inkjet head for recording. For preventing contamination of the original, the loop or marks can be drawn on the original through an original cover including a transparent or semitransparent sheet member facing the image of the original. Images inside and outside the area or areas can be selectively reproduced in various combinations of the normal mode, red output modes involving different types of color conversion, and extinguishing mode. Image data from another source which is stored in another memory can be inserted at a desired part of the reproduced copy.

In U.S. Pat. No. 4,777,510, there is disclosed an apparatus and method for electrophotographic reproduction with areas of spot color or with other special treatment. An original document sheet that, for example, is to be reproduced with spot color or color accenting, is highlighted by use of a highlighting marking pen in the areas in which spot color is desired. The original is then scanned by the apparatus to provide signals regarding the locations of the areas of image information to be specially treated. The document sheet is then imaged upon an electrostatically charged photoconductor and developed so that the areas to be specially treated are developed with toner of a different color from that of other portions of the reproduction. Such special treatment may alternatively involve selective halftone screening of an area of the reproduction, shifting of one area relative to another, erasure of a portion from the original, or programming a job stream (a reproduction sequence such as chapterization) when reproducing a multisheet original document.

The reproduction apparatus includes a control panel with input keys for indicating one or more modes of treatment. For example, when spot color is desired, the spot color mode button is depressed and selection made of the respective colors for the non-highlighted information and highlighted information using other color indicating buttons. Once a color, for example black, is chosen for reproduction of the non-highlighted information, the operator may choose to have the highlighted information reproduced in red, green or blue. Several areas on one page may similarly be treated if each area is properly highlighted.

However, the above reproduction apparatus could be simplified by eliminating the selection of special treatments via dedicated control keys. Key operation is always a time-consuming hindrance and is feasible only at the apparatus chosen for making the copies. Moreover, the task of editing—which typically entails the selection of at least one special treatment per original document page—is often done best (or most conveniently) at a place away from the reproduction apparatus, that is, off-line. The task is typically performed during the usual editing process at a desk, office, or other location remote from the copier. The user who devises the editing then is forced to retain the treatment selections in memory, or to record such on scratch paper or the original, to prompt the copier operator for key mode selection later in the reproduction process (when the original is taken to the copier). The difficulty and fallibility of these stopgap methods is commonplace.

It is further desirable that the original be useable at any one of several reproduction apparatus that is equipped with the proper sensing and logic means. In this way the original would be useable at any of several copier machines at the operator's workplace; alternatively, the original could be transported to another site, perhaps many miles distant, for use with equal success. This feature is especially desirable in the event a particular treatment combination is formulated by a user who forgets or otherwise does not anticipate that the combination will be used again. Additionally, as may be inferred from the above, many users are merely unable or unwilling to record a particular combination of treatment modalities. Unfortunately, any treatment mode information is typically cleared from the machine when the next reproduction job is begun; the combination is not easily retained by the original; and the operator's memory is quite unreliable.

A typical example of such a situation occurs when all duplicates of an important form are depleted, leaving only the original, and yet more duplicates must be made. In the absence of some record of a particularly complex combination of modalities and highlighted area coordinates, the combination can be recreated only after a trial-and-error effort. This situation is particularly difficult when the original highlighting is invisible, or when the editor who originally specified the combination is unavailable.

Further, simply marking multiple areas for special treatment does not indicate which of several selectable treatment modes should be applied to a particular area. The apparatus is incapable of distinguishing between several highlighted areas when different treatment modes are to be applied to more than one area. Hence, in the prior art, all highlighted areas on one sheet are usually treated alike. In U.S. Pat. No. 4,777,510, code marks written in a selected margin area of the original can be used to distinguish between different areas of highlighted information. The code is read and deciphered by a logic and control unit (LCU) and thus the operator need not input the information manually on the control panel. In lieu of a code, different highlight inks may be sensed for distinguishing between two or more areas. However, such methods and apparatus are still difficult to use in that a marginal mark is esoteric (the mark is not immediately recognizable as a symbol of its respective treatment mode) and inconvenient (the needed mark or ink color is often forgotten or incorrectly used.) A system of code marks is necessarily encoded according to a scheme which may be difficult for the casual user to reconstruct. Similarly, (in the multiple-ink scheme) a multiplicity of areas requires a corresponding number of differing inks, which is also quite inconvenient.

Many reproduction jobs require that more than one treatment mode be applied to a particular original sheet. The placement of marks at the margin can create ambiguity, in that the positioning of a mark is critical with respect to the highlighted area.

Accordingly, a user needs to be able to highlight a particular area and then add distinguishing information to the highlighted area in a quick, simple, and familiar motion. The preferred highlighting procedure would require no particular combination of inks, code marks, or other unusual steps, devices, or materials. The preferred procedure would thus follow a scheme that is easily learned and remembered, and which is unambiguous in indicating the relationship between the highlighting and the respective areas to be treated. The scheme would be adaptable to a variety of treatment mode combinations, languages, customs, alphabets, and other user-specific conditions and needs that may exist worldwide.

SUMMARY OF THE INVENTION

The invention pertains to an apparatus and method for electrophotographically reproducing an original document sheet so that the reproduction is provided with areas of spot color or with other special treatment. An original document sheet that is to be reproduced with special treatment of the information contained thereon is highlighted in the area or areas in which treatment is desired. Additionally, according to an alphanumeric charactericoding scheme, one or more characters are written within one or more of the highlighted areas. The original is then scanned by the apparatus to provide signals regarding the locations of the highlighted areas of image information to be specially treated. Character recognition is employed to detect each character drawn using the highlighter and a corresponding treatment mode is selected for the respective highlighted area.

There is also provided a method and apparatus for reproducing a portion of image information present upon a document sheet, the portion being located either in a first area between a first loop of ink and a second loop of ink located within the first loop or in a second area located within the second loop. The method and apparatus comprises scanning the document sheet for the presence of the ink and generating respective output signals upon detection of same, processing the output signals to produce signal sets representing the boundaries of the first and second loops, and reproducing upon a record sheet the portion of the image information in one of said two areas while not reproducing image information within the other.

In a modification of the above the method and apparatus the invention provides a reproduction with a spot coloring of an area within the loops while reproducing certain information in the original color.

BRIEF DESCRIPTION OF THE DRAWINGS

The subsequent description of the preferred embodiment of the present invention refers to the attached drawings wherein:

FIG. 4 is a schematic illustrating an image scanner station for receiving original document sheets with block diagrams of related processing, buffering, and bit mapping apparatus for use in the apparatus of FIGS. 1a and 1b.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art. For convenience, "copier" and "electrophotographic apparatus" will be used interchangeably, and such terms are intended to apply to other types of image reproduction apparatus unless such application is clearly inappropriate.

Figure 1A:
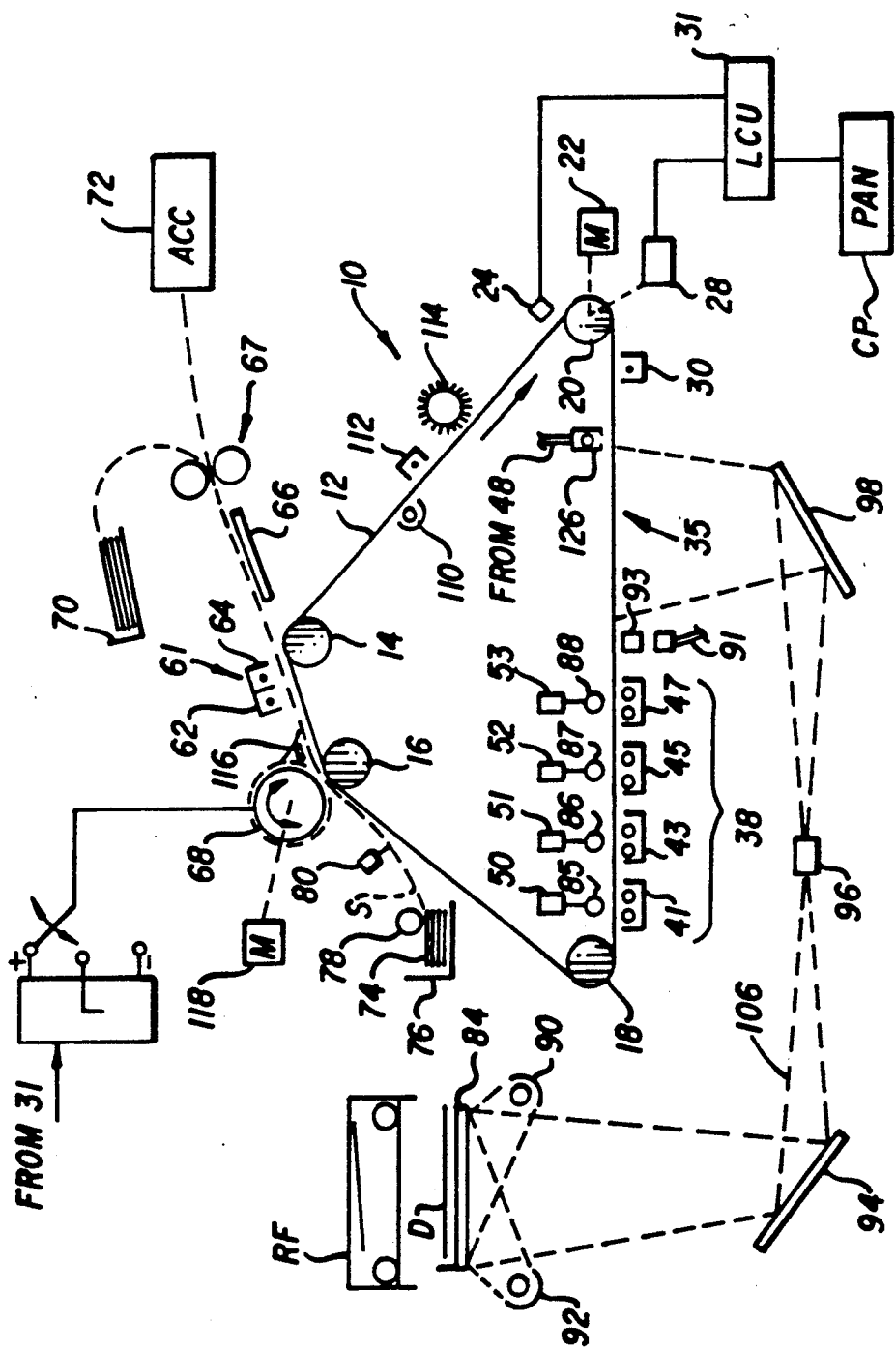
FIG. 1a is a schematic of a side view of the operating elements of a multicolor electrophotographic reproduction apparatus useable for practice of the present invention.
Figure 1B:
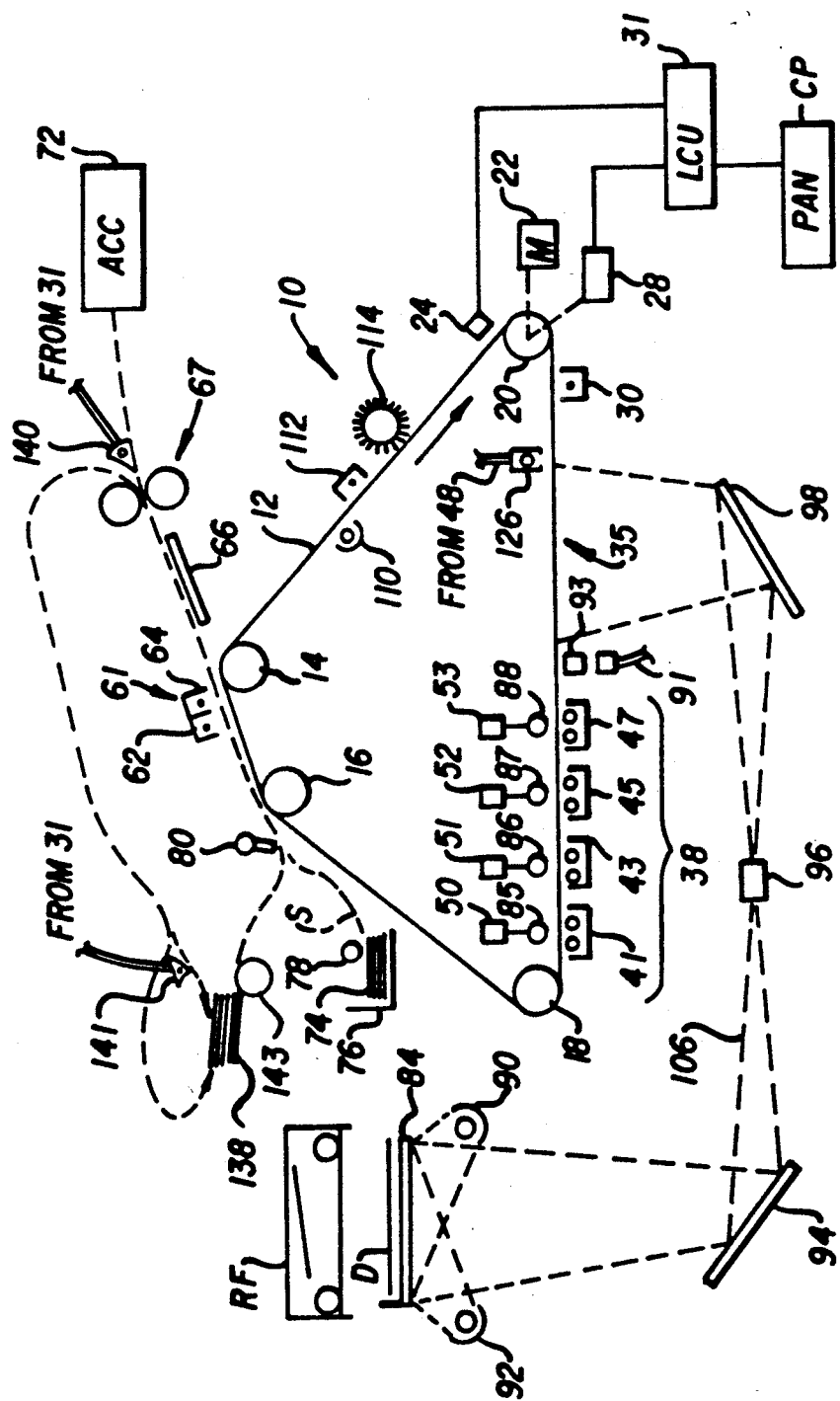
FIG. 1b is a similar view to that of FIG. 1a but of a modified apparatus.

With reference to FIGS. 1a and 1b, a four-color electrophotographic reproduction apparatus is shown. The apparatus 10 includes a closed-loop image transfer member, or flexible photoconductive web 12. The web 12 is supported on rollers 14, 16, 18 and 20. The rollers are mounted on the copier frame (not shown) with one of the rollers, for example, roller 20, rotatively driven by a motor 22 to rotate the web 12 in a clockwise direction about its closed path. The web has a plurality of sequentially-spaced image areas which pass successively through electrophotographic processing stations (charge, expose, develop, transfer, clean). The web also includes timing marks (or perforations) which are sensed by appropriate means, such as a timing signal generator 24 and logic and control unit (LCU) 31. An encoder 28 associated with the roller drive motor 22 also produces timing signals for the LCU.

The LCU 31 controls the electrophotographic process based on the instantaneous location of the web in the travel path. The LCU 31 has a digital computer, preferably a microprocessor, which is responsive to the input signals for sequentially operating the work stations and other machine functions. The programming of a commercially available microprocessor is a conventional skill; the particular details of any such program would depend on the architecture of the designated microprocessor.

Figure 2:
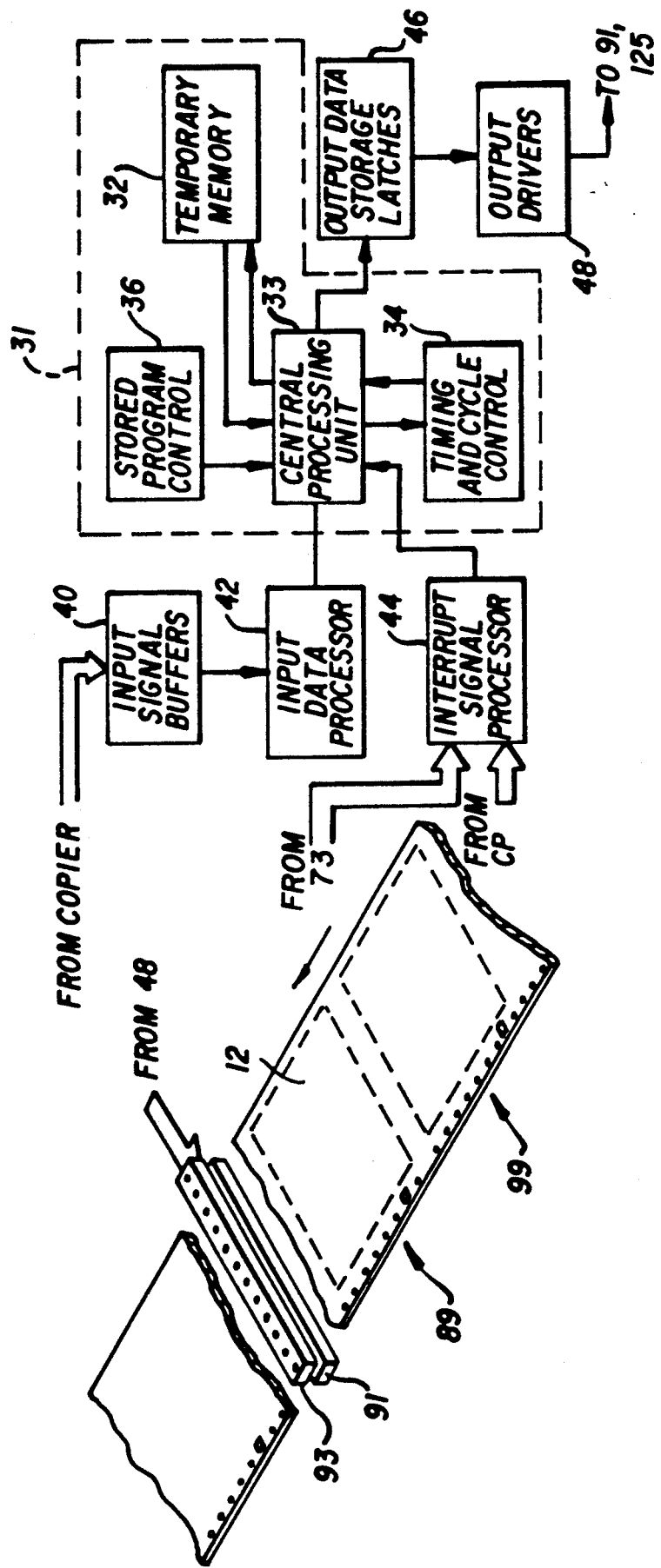
FIG. 2 is a schematic illustrating an LED array and block diagrams of controls for use in the apparatus of FIGS. 1a and 1b.

With further reference to FIG. 2, a block diagram of the LCU 31 is shown. The LCU consists of temporary data storage memory 32, central processing unit 33, timing and cycle control unit 34, and stored program control 36. Input data are applied either through input signal buffers 40 to an input data processor 42 or to interrupt signal processor 44. The input data are derived from various switches, sensors, and analog-to-digital converters. Input data and control signals from the LCU 31 are applied to storage latches 46 and then to output drivers 48 which transmit the signals to the various work stations, mechanisms, and controlled components associated with the apparatus. For example, data processed by the LCU 31 is used to indicate the number of copies to be made.

Figure 3A:
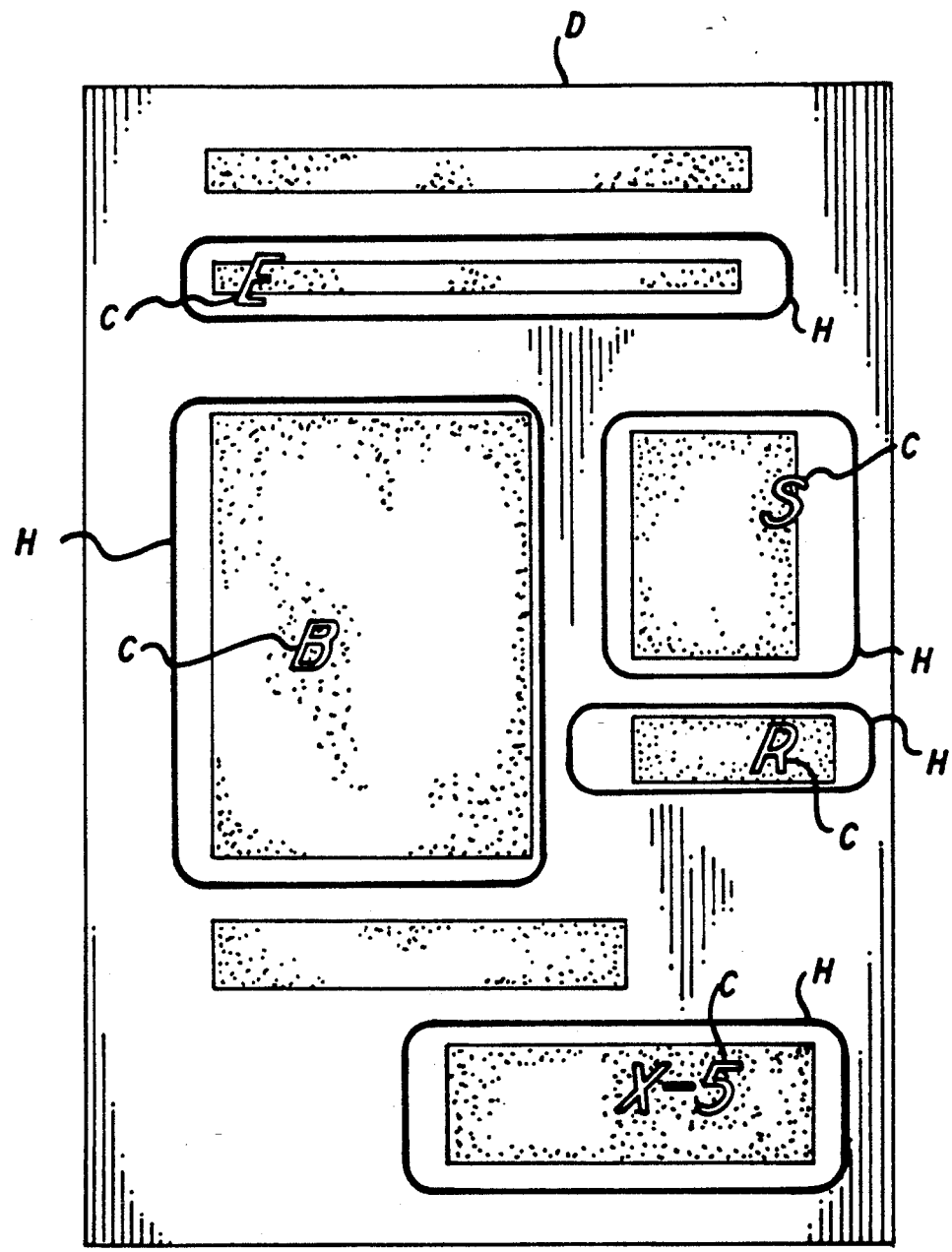
FIG. 3a is an illustration of an original document sheet showing various highlighted areas to be specially treated by the apparatus of FIGS. 1a or 1b.

In FIGS. 3a-3d, two examples of an original document sheet D are illustrated. The sheet D is to be reproduced with a special treatment, or combination of treatments, to one or more areas of the information on the sheet D. For example, spot color reproduction is one such special treatment. Accordingly, a selected area of the sheet D is bounded with highlighting H in a simple motion. As shown in FIG. 3a, in practicing the method according to the present invention, the boundary forms a closed loop around the area of interest. For areas too small for a closed loop, the boundary may be reduced to a stroke that covers the area of interest. By providing the boundary around an area on the document sheet, the user is indicating that the information enclosed in the selected area so defined will be treated according to one or more selectable treatment modes.

To specify which of the available treatment modes is to be applied to a highlighted area, the operator uses the highlighter to draw a character representing each mode on the sheet D. Each character is drawn within the highlighter loop. When the highlighted area is too small to contain the character, a selectable default mode is used instead. The default mode will apply to all boundaries that lack a character therein. The inputting of the default mode will be described below.

An original document sheet that is, for example, to be reproduced with spot color or color accenting would include a selected character within each highlighted area in which spot color is desired. In the machine to be described, spot color is available in four colors. One color, for example black, is used as a default color for reproduction of the non-highlighted (background) information. The highlighted information then may be reproduced in red, green or blue. Thus, when spot color in red is desired, the spot color character "R" (as shown) would be applied; other selectable characters are selected from the preconfigured spot color palette, such as "G" for green and "B" (as shown) for blue.

The application of one or more alphanumeric characters to a selected area is termed "character coding". This terminology is used for convenience to denote an entry of a representative mark or symbol and does not restrict the useable characters to a particularly abstract code or scheme. Indeed, in the preferred embodiment, the characters are alphanumeric and are easily recognized by the operator if applied with a visible highlighting ink. A library of other characters is easily programmable to suit the user, such as known libraries of scientific symbols and proofreader's marks, which are also considered characters.

The character-coding of a variety of special treatments is contemplated by this method. Selective halftone screening of an area of the reproduction may be specified by "S" (as shown). Image shifting of one area relative to the page format may be specified by "X" (for horizontal shifting) plus a numeral indicating the shift magnitude. For example, "X-5" (as shown) would indicate a respective shift in the x axis in standard increments, e.g. tenths of inches or centimeters. Erasure, that is, non-reproduction or blanking of a highlighted portion of the page, may be specified by "E" (as shown). To specify job stream programming when reproducing a multisheet original document, one or more characters (not shown) (such as "C" for chapterization or "I" for page insertion) may be similarly used on the respective originals or inserts. Each highlighted area may include more than one character to specify a combination of treatments for the respective area. An example would be "S R" to specify an area for reproduction in a screen mode and in red spot color. Additionally, one character could be selectable as representing a particular combination of modes, such as "A" (attention mode) for a combination of spot color and image shift of a predetermined amount, so as to make the highlighted text "stand out" from the other text. A highlighting loop and a "security" character could be placed on each portion of an original that is confidential (i.e., non-reproducable) or is intended for distribution to certain users. The character would then designate the area as one where reproduction is to be inhibited.

Figure 3B:
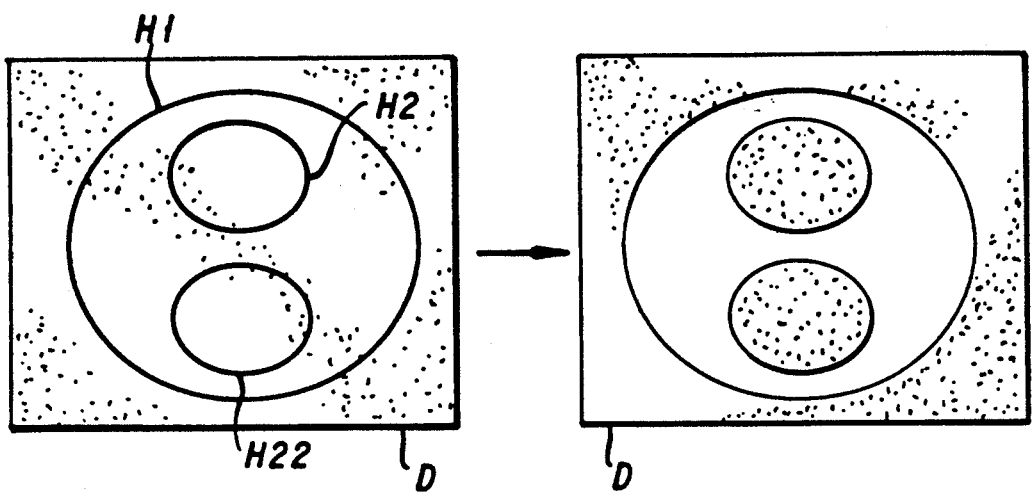
FIGS. 3b-3d are illustrations of portions of another original document sheet showing various highlighted areas to be specially treated and the corresponding portions of the resulting document reproductions.
Figure 3C:
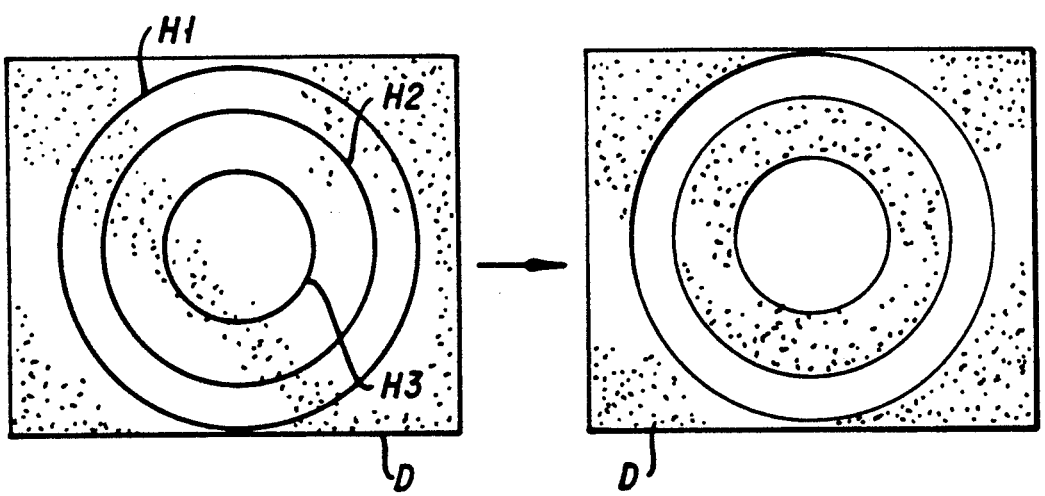
Figure 3D:
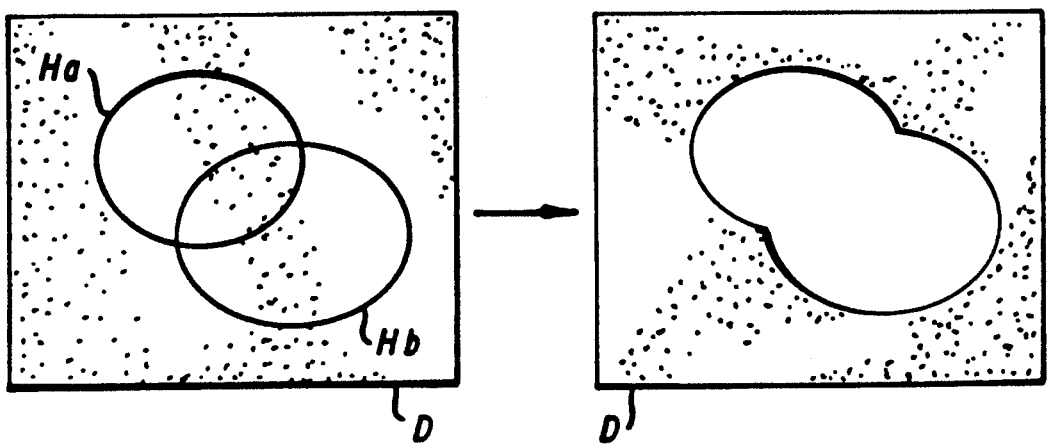

By highlighting an area on the document, the operator is requesting a treatment mode for all of the area enclosed (including the area marked by the highlighter). As illustrated in FIGS. 3b–3c, if the operator wishes to exclude one or secondary areas located within a primary encircled area, the operator may again use the highlighter to enclose those secondary areas. As the sets of loops progress inward, the numerical order of each set increases. The evennumbered loops thus define areas that are not treated. For example, as illustrated in FIG. 3b, if the area $H_1$ is character-coded for erasure, the operator may exclude one or more secondary areas within the primary area by enclosing the areas with respective fluorescent loops $H_2$ and $H_{22}$. Each loop location is thus indicated for translation by algorithms which accord the specified treatment to the odd-numbered loops; the even-numbered loops do not receive treatment. As illustrated in FIG. 3c, if the area $H_1$ is character-coded for erasure, the area within the third (innermost) loop $H_3$ and the area between the outermost (or primary) loop $H_1$ and the median loop $H_2$ are treated. (In FIGS. 3b–3d, the character which typically specifies erasure, "E", is not shown for purposes of clarity. However, if the character "E" were to be intentionally omitted in an actual application, the default mode would specify the treatment.)

Only those areas which are completely enclosed are identified as looped areas. Because the operator is free to select more than one area for treatment, overlapping loops will be joined and both the circled areas will be combined, as illustrated by $H_A$ and $H_B$ in FIG. 3d.

It will be appreciated that the useable alphanumeric characters are selectable from a basic predetermined library that may be established according to the needs of the operator. Accordingly, although the characters described above are expected to have common usage, other characters may be adopted to conform to the languages, customs, or conventions preferred by the operator.

For the purposes of this disclosure, the terms "highlighting instrument" or "marker" should be interpreted as including any instrument capable of altering the document in a fashion such that a highlighted area is distinguishable as a selected area by a corresponding detector in the reproduction apparatus. The commonly used term "highlighter" is often used to refer to a felt-tip pen for applying highlighting ink; the term is encompassed by highlighting instrument. "Highlighting" refers to the act of selecting areas by the use of a highlighter; thus, "highlighted" refers to the condition of certain portions of the document sheet that have been altered by the highlighter's effect. Such highlighting would not impede the reproduction of the original information (and optionally is invisible to the unaided eye). A highlighted area would therefore be an area selected by the use of a highlighter.

In the preferred embodiment, a highlighted area is one enclosed by a continuous loop of highlighting ink. However, in the present invention it is contemplated that modifications of the preferred embodiment would encompass various other editing conventions, such as bracketing or underlining. The highlighting material is preferably an ultraviolet (UV) active ink, of yellow/green color and preferably transparent so as not to obliterate or mask the area so covered. This highlighter ink, when stimulated by light radiation of short (UV) wavelengths, will emit light. Optionally, the highlighting material can be invisible so as to give no indication that it has been applied. The highlighting material may be applied simply with a felt-tip pen or other writing instrument. Both the closed loop and the character code may be drawn with the same highlighting instrument.

Turning now to FIG. 4, the highlighted document sheet D is illustrated as being fed into driven rollers 77, which in turn drive the document sheet over a scanner 81. The scanning device may comprise a plurality of photoelectric sensors, such as CCD's or photodiodes, that are responsive to light in the spectral range emitted by the U.V. active ink. The scanner 81 is similar to conventional image scanners except that it is provided with sensors responsive to a threshold level of light of predetermined spectral bandwidth. The sensors are arranged linearly across the transverse direction of the document sheet to scan the entire sheet as it is transported onto a transparent glass platen 84. Suitable means may be provided for detecting the leading and trailing edges of the sheet to provide signals to commence and terminate scanning respectively.

The highlighting material is stimulated by a UV source 83 such as a center tube fluorescent lamp. The sensor will respond to the particular spectral emission from the highlighting material as distinguished from emissions from the underlying sheet D. The emission stimulated from any one of a class of sharp cut-off dyes, such as the preferred Europium (III) thenolyl tri-fluoroacetonate, provides a measurable signal difference between the highlighter and the sheet, even though some sheets may contain fluorescent whiteners. The phosphors in the lamp 83 are preferably optimized for stimulating the Europium dye; however, dyes found in conventional yellow highlight pens purchased at a stationery store are sufficiently activated also. As each line of the sheet is scanned, certain sensors detect any UV-illuminated areas directly above them and their respective output signals represent areas of highlighting as a series of analog voltages. Each voltage corresponds to the presence or lack of the emitted light at a resolution of 400 dots per inch (dpi).

Figure 5A:
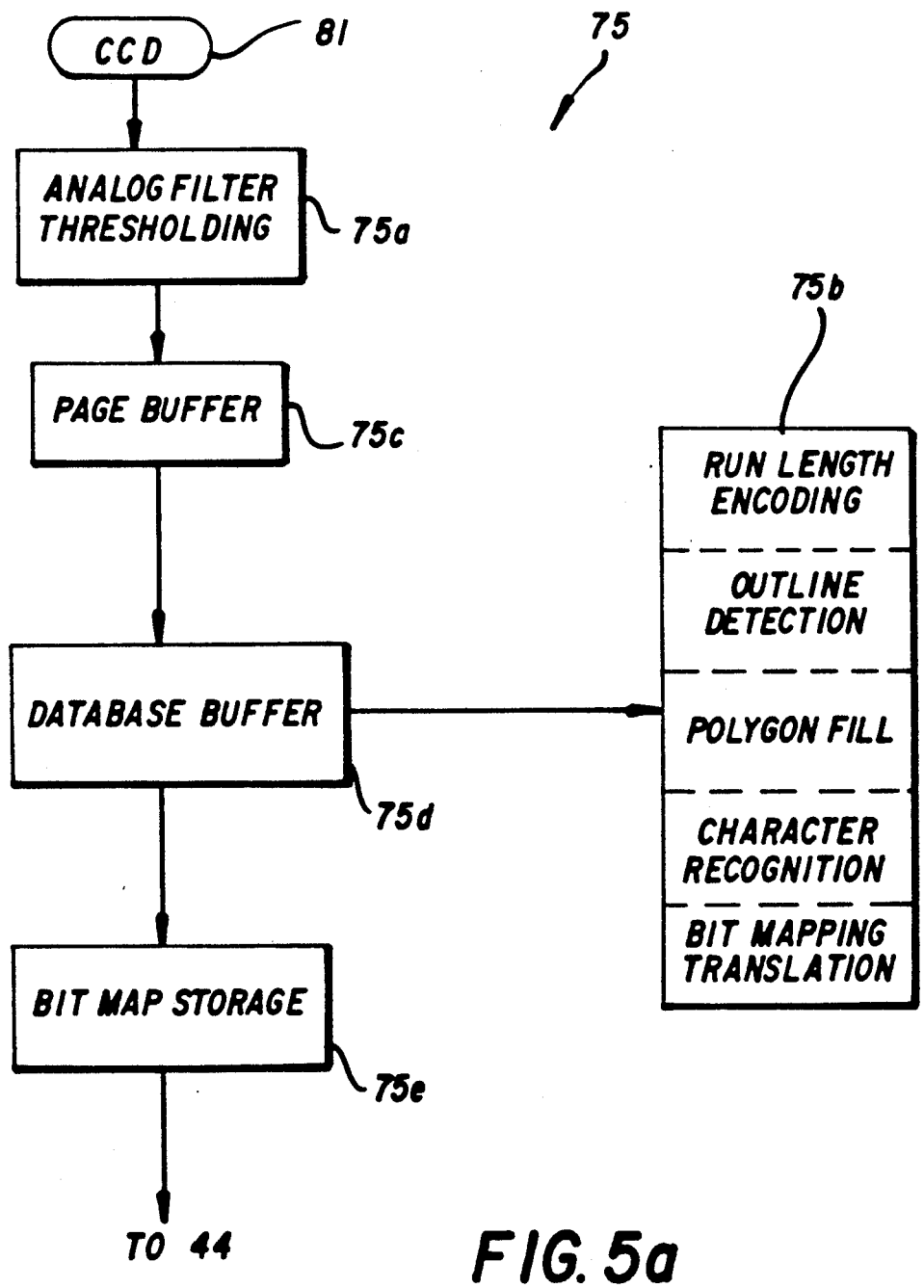
FIGS. 5a-5c are flowchart schematics illustrating the image processing algorithms used in the image scanner processor shown in FIG. 4.

As further illustrated in FIG. 5a, the signal from each scanner sensor in the CCD 81 is fed to an image scanner processor and buffer 75 which logically decides which signals represent highlighted areas and which signals represent unhighlighted areas. An analog filter and threshold section 75a converts the signal resolution from 400 dpi to 25 dpi. The thresholding section 75a may include comparator devices to distinguish highlighted areas from unhighlighted areas on a support that is somewhat reflective to UV light. Each line of scan data (i.e. a scan line) generated by the CCD array 81 is encoded by a processor 75b into run length codes as it is received from the scanner. After the entire document page has been scanned and stored in a page buffer 75c, the page is processed to create a bit map. The processing includes an outline detection algorithm applied to the encoded scan data by the processor 75b. The resulting database generated in the database buffer 75d is further processed to identify a region that has been completely enclosed, so as to distinguish a closed continuous loop or single stroke of highlighting material. Whether the region defines a closed area or a simply a highlighted stroke (line), or whether the region encloses any other sub-regions, are determined by an outline detection algorithm. A polygon fill algorithm will then translate the areas into the bit map. Once the database has been completely processed and translated into the bit map, the bit map is ready for output from the bit map storage 75e to the interrupt signal processor 44.

Figure 5B:
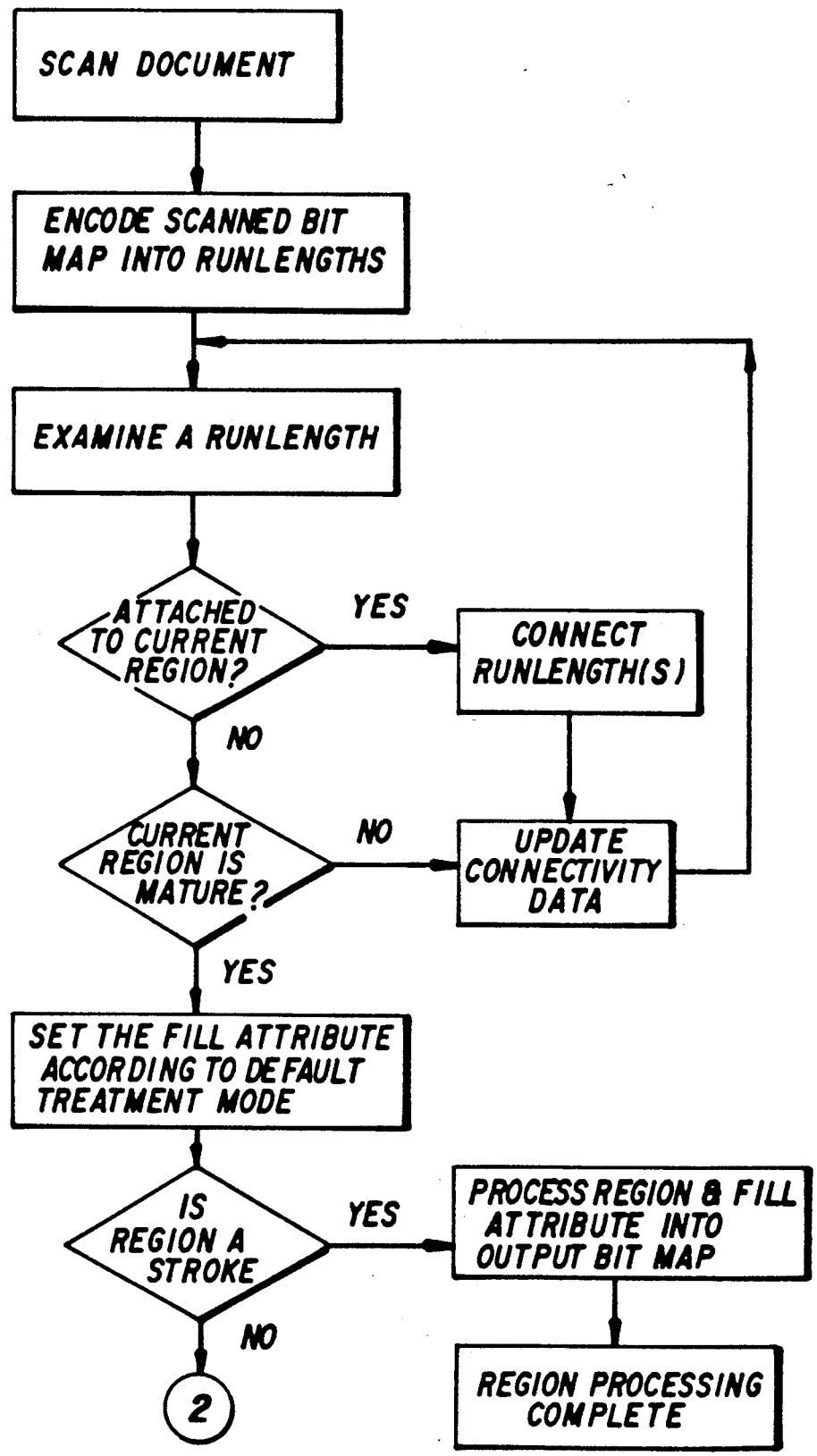

As further illustrated in FIG. 5b, application software residing in the image scanner processor 75b is responsible for encoding the scan data into runlength codes, performing the outline detection algorithm on the runlength codes, generating a bit map, and outputting the bit map. The application software further recognizes each highlighted character, using known character recognition schemes, and associates the respective highlighted area that encloses the highlighted character. The highlighted character (or the default mode, if the character is absent) is translated to an instruction set suitable for use by the processor 75 in creating the respective bit map(s) for that image frame. Another instruction set may be provided to the interrupt signal processor 44 and the LCU 31 to carry out the respective treatment mode instruction. These inputs are converted into signals and stored in temporary memory 32 via interrupt signal processor 44. (Combinations of characters are similarly recognized and translated.) A programmable library of characters and character combinations is used with the character recognition software. The library is programmable according to the needs of the operator.

The runlength codes represent the horizontal intercepts of scan data along a scan line (which is parallel to the length of the scanner). The scan data generated by the CCD contact scanner 81 is stored in a two dimensional array that is 320 bits (10 longwords) wide per line and 212 lines deep. After all runlengths for the scanline have been encoded and stored in the array, a zero is entered into the array to signify the end of the scanline for a connectivity analysis. The outline detection algorithm processes the runlength codes to form a linked list of data structures. The list represents isolated regions of highlighter ink on the document. These data structures constitute a data base of region data and enclosure relationships from which circled regions can be identified and filled.

For example, a current horizontal intercept is obtained from the array of runlengths. Two runlengths in sequence represent a horizontal intercept along a scanline. The first runlength is the leading edge of the intercept and the second is the trailing edge. The end of a scanline is signified by a runlength whose value is zero. Next, an immature region is discerned as representing an isolated region of highlighter ink which is vertically contiguous. (All regions are considered to be immature until a scanline occurs which does not contain any horizontal intercepts which belong to the region, and the region is not hosted as a subtree of any other region.) The bit map is generated by performing a polygon edge fill of the points in the edge list of the region. Each edge is represented by a structure which has an x coordinate field—which represents either a leading or trailing edge of a horizontal intercept—and a y coordinate field—which represents the scanline of the horizontal intercept. Once all mature regions have been processed, the bit map is complete and ready for output.

After the document D has been fully scanned, it reaches a stop provided at an edge of the platen 84, which positions the document sheet so as to be in register with image frames on the photoconductive web 12 during an exposure. The original document sheet D is now oriented, image side down, on transparent glass platen 84 that is supported by the copier frame.

The control panel CP includes the message display 133, spot color mode buttons 56 and 60, screen 129 or delete 135 mode buttons, and image shift indication and directional buttons 130, 131, and 132. For example, to select spot color, the spot color mode button 56 is depressed and the respective colors for the non-highlighted information and highlighted information are selected by using buttons 57, 58 and color indicating buttons 60. By pressing a directional button several times the total inputted displacements may be added and displayed on display 133. If the override condition is selected, the treatment mode entered on the control panel CP will be applied to all the highlighted areas on the sheet D, as was described above with reference to U.S. Pat. No. 4,777,510. Signals from the control panel are stored in temporary memory 32 via interrupt signal processor 44.

In the preferred embodiment of the present invention, the control panel treatment mode buttons are typically reserved for back-up, secondary, or default operation. Operation of the mode buttons is expected to be unnecessary when an original document has been highlighted according to the above method. Hence, the mode buttons are most often used for selecting special treatment in reproducing an original that has not been character-coded or that requires a default mode to be specified.

If the original document D has a boundary (such as a stroke) that therein lacks a character, a prompt from a message display 133 allows the operator to specify a default mode by manually inputting the default treatment mode into the control panel CP. Character recognition in general may be similarly bypassed by directly entering the default treatment mode information on the control panel CP when prompted at the onset of the reproduction job. The override thus attributes the default mode to all boundaries including those which have a character therein. Such an option could, for example, be exercised when the operator desires to reproduce information on a sheet D in a fashion other than that already indicated by the character coding.

Figure 6:
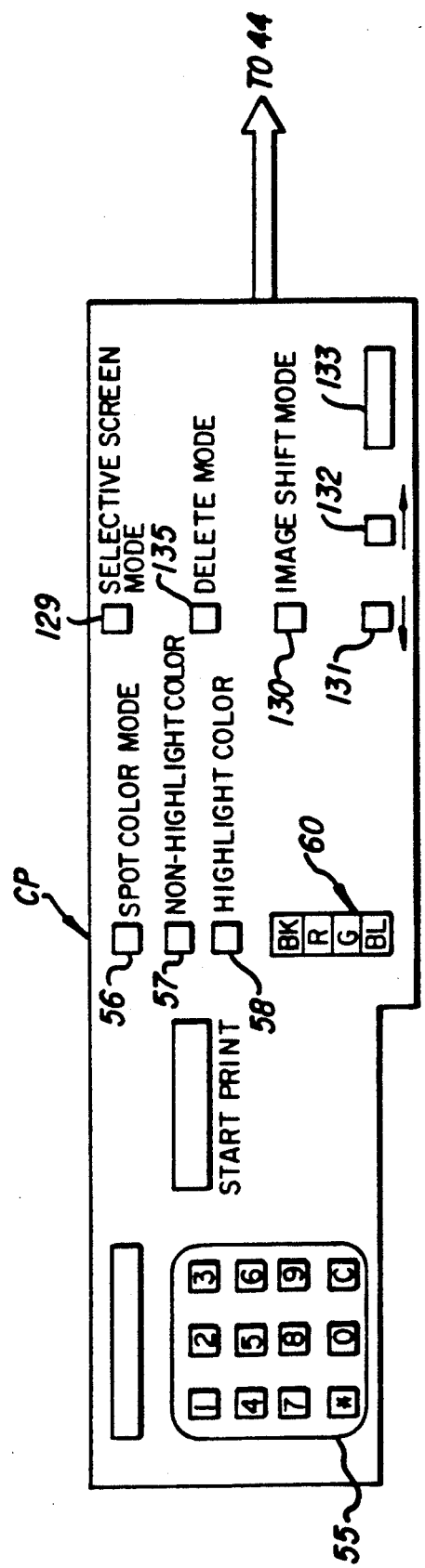
FIG. 6 is a schematic illustrating a data input and control panel for controlling the apparatus shown in FIGS. 1a and 1b.

If the processing of the highlighting material configuration is unsuccessful, the LCU 31 may so inform the operator by causing an alarm tone to be emitted from an acoustic transducer (not shown) or a message to be displayed at the display window 133 on the control panel CP shown in FIG. 6. The operator then has the option of removing the sheet D to examine it for an error or a malfunction such as inadequate or incorrect highlighting, or to see if a default treatment mode must be specified.

However, when the sheet D includes an area that is character coded for security measures, the image scanner processor and buffer 75 would normally enforce such security measures, in lieu of any contrary control panel selection. To authorize the control panel to override even a security measure, the LCU 31 may be programmed to accept a security pass code entered by the operator at the keyboard 55. Selections made using the control panel CP would then be dominant and the character-coding for the security measure would be overridden.

With reference now to FIG. 7 and again to FIGS. 1a and 4, a description will now be given of the reproduction of an original sheet that has been highlighted for red accent color. (The character for red spot color, "R", has been omitted from the highlighted area H in FIG. 7 for clarity.) The process is similar to, and thus illustrative of, other selectable machine treatment modes, as will be described shortly.

Figure 7:
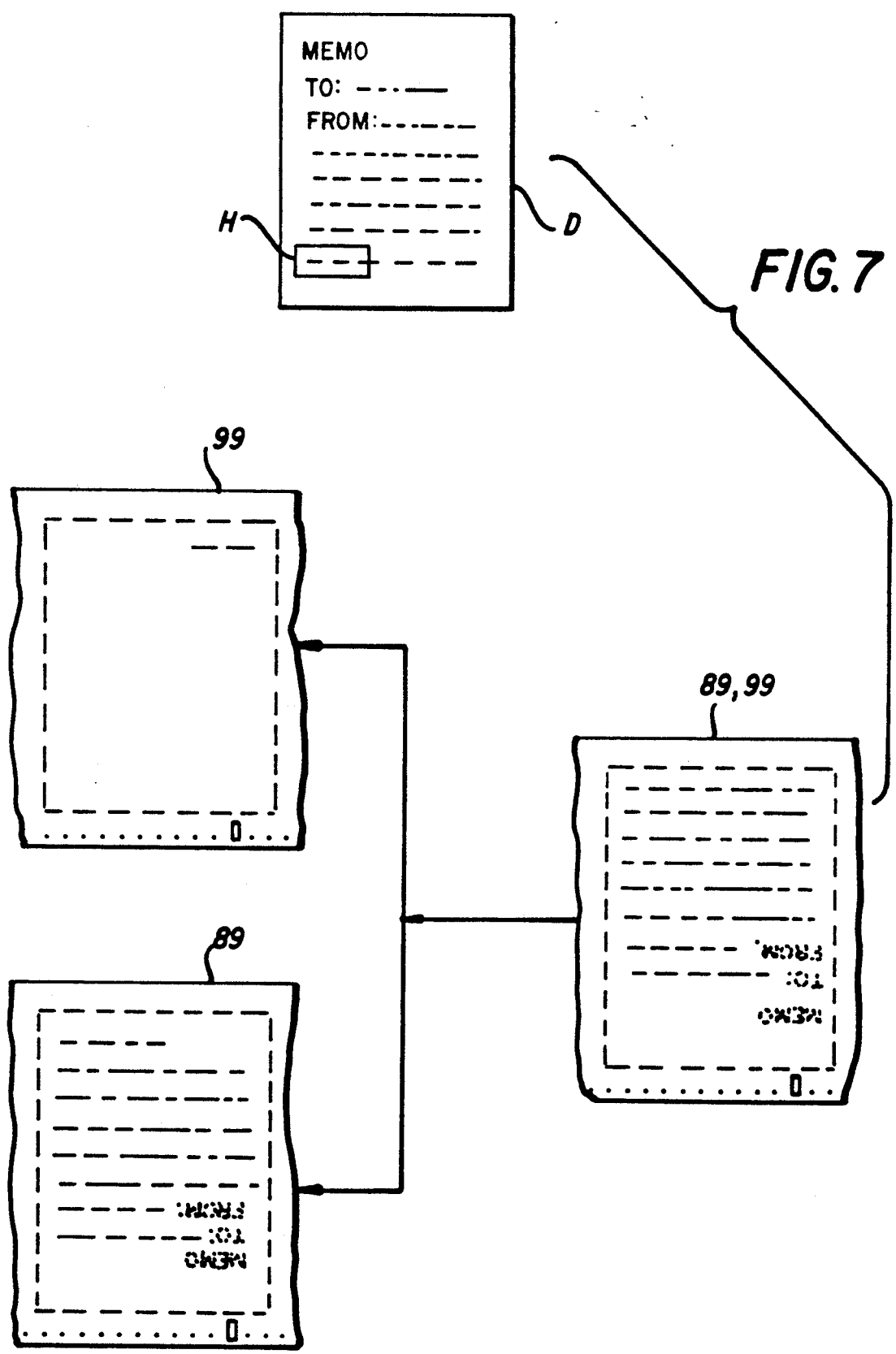
FIG. 7 is an illustration of another highlighted original document sheet and the corresponding image frames on the photoconductor used to produce a color-accented copy.

With reference to FIG. 1a, the preferred embodiment includes exposure lamps 90 and 92 located beneath the platen 84 within the frame of the reproduction apparatus 10. The lamps flood the document sheet with light and a reflected image of the document sheet is transmitted via mirror 94, lens 96, and mirror 98 in focus on rays 106 to an area 35 lying in the plane of the web 12. Thus, as it is desired to reproduce the document sheet in two colors, the document sheet D is illuminated two times in succession to form two separate electrostatic latent images thereof, as illustrated in FIG. 7. The timing of the flash of lamps 90, 92 is controlled by the LCU and related to the travel of the web 12 to expose adjacent, nonoverlapping areas of the web to the images of the document sheet. One or more corona charging units, exemplified by corona charger 30, is located upstream of the exposure area 35, and applies a uniform primary electrostatic charge of negative polarity to the web 12 as it passes the charger and before it enters the exposure area. The photoconductive properties of the web cause the primary charge in the exposed areas of the web to be discharged in that portion struck by the exposure light. This forms latent imagewise charge patterns on the web in the exposed areas corresponding to the image on the document sheet. The properties of the materials used for highlighting are such that the latent images are formed as if the highlighting material is not present on the original sheet D.

In accordance with the bit map, a selective erase means erases the areas of one image frame that represent highlighted areas and erases the areas of the other image frame that represent unhighlighted areas. As illustrated in FIGS. 2 and 7, based on synchronized timing signals and the registration of the original on the platen, the first image frame 89 passes above the selective erase means 93. Signals from bit map 73 representing areas to be selectively erased on frame 89 are inputted through interrupt signal processor 44 into the LCU 31. The LCU 31, in response to timing signals from the timing signal generator 24 and/or encoder 28, enables output drivers 48 to activate a linear LED array 91 situated transverse to and proximate the web surface. Alternatively, the LED array 91 may be spaced from the web surface and illuminate an intermediate gradient index lens array 93, such as a SELFOC (trademark of Nippon Sheet Glass Co., Ltd.) array. Light passed through the lens 93 is directed to illuminate the photoconductor 12. While the next image frame passes over the selective erase means, the LCU 31 provides an inverse logic operation to selectively erase all information on image frame 99 except for that to be color accented.

The web then rotates to bring the selectively-erased latent images into a development area 38. The development area has a plurality of magnetic brush development stations, each containing a different color of toner. For example, the toner colors may be black, red, green and blue. Thus, the red toner particles may be in station 43, green toner particles in station 45, blue particles in station 47, and black particles in station 41. The toner particles are agitated in the respective developer stations to exhibit a triboelectric charge of opposite polarity to the latent imagewise charge pattern. Backup rollers 85, 86, 87, and 88, oppose respective developer stations 41, 43, 45 and 47. Actuators 50, 51, 52 and 53 selectively move the respective backup rollers into contact with the web 12 to engage the web with the respective magnetic brushes. The charged toner particles in the engaged magnetic brush are attracted to and develop the oppositely-charged latent image.

If, for example, the first image frame 89 is to be developed in black and the second image frame 99 is to be developed in red, as the image frame 89 reaches the black development station 41, actuator 50 moves the backup roller 85 to deflect the web toward the station 41. When the first image frame leaves the development area of station 41, the actuator 50 returns the backup roller 85 to its nondeflecting position. The second image frame 99 (containing only the information for red development) is similarly developed with only red toner from station 43.

The developed black and red image frames are then transferred and superimposed on a receiver sheet in accurate register to form a reproduction of the original with the highlighted information in red. This is accomplished by feeding a receiver sheet S from a supply stack 74 in hopper 76, using roller 78 in synchronism with movement of the first image frame. The receiver sheet engages the web and is registered by mechanism 80 with the first image frame. A transfer roller 68 having a compliant insulating surface is electrically biased for attracting the developed image to sheet S. Roller 68 is driven by a stepper motor 118 which receives actuating signals from the LCU 31. The receiver sheet S clings to roller 68 due to the bias potential; alternatively, a vacuum-assist or a sheet-clamping mechanism may be used.

Synchronized rotation of roller 68 and web 12 brings the leading edge of the copy sheet S back into transferable relationship with the web as the leading edge of the next (black) toner image arrives at roller 68. The bias on roller 68 is reversed to repel sheet S from roller 68 along separator curve 116 to web 12 in registration with the second image frame. The image is transferred to the receiver sheet at transfer station 61 by transfer charger 62. The copy sheet S is separated from the web at detacker 64 and conveyed by air transport 66 to roller fuser 67 and exit hopper 70 or accessory finishing unit 72. A corona charging station 112 and a rear erase lamp 110 may be located upstream of a cleaning unit 114 to neutralize any charge remaining on the web. This method and apparatus for image transfer is described in U.S. Pat. Nos. 4,477,176, issued Oct. 16, 1984 and 4,251,154, issued Feb. 17, 1981 in the name of Matthew J. Russel, which are incorporated herein by this reference.

A modification is provided in the embodiment shown in FIG. 1b in lieu of forming different colored image frames in succession and transferring them to a receiver sheet. The document D is repeatedly exposed and image upon successive image frames of photoconductor 12 at exposure area 35. The information which is highlighted on the original document D for spot color is selectively erased on each of these image frames. All of the image frames are developed with black toner and then transferred and fixed to respective receiver sheets S. The receiver sheets are returned to an intermediate tray using diverters 140, 141. The diverter 140 directs the receiver sheets either to the intermediate tray 138 or to the accessory output unit 72. The diverter 141 directs the receiver sheets to be selectively flipped when placed in the intermediate tray 138. When the number of exposures of image frames is sufficient for the number of copies requested, additional successive exposures of a document D make a corresponding number of image frames. The non-highlighted information is then selectively erased from these image frames and developed with the spot color toner. The receiver sheets in intermediate tray 138 are delivered serially into timed registration with the image frames on the web by feed roller 143 and registration mechanism 80 to transfer the red color information to the sheets. The sheets are then fixed and they are fed serially to the accessory unit 72. Thus, the ability to invert the receiver sheets in the intermediate tray enables the spot coloring to be applied in register to the same surface of the sheet as that receiving the black toned areas.

Figure 5C:
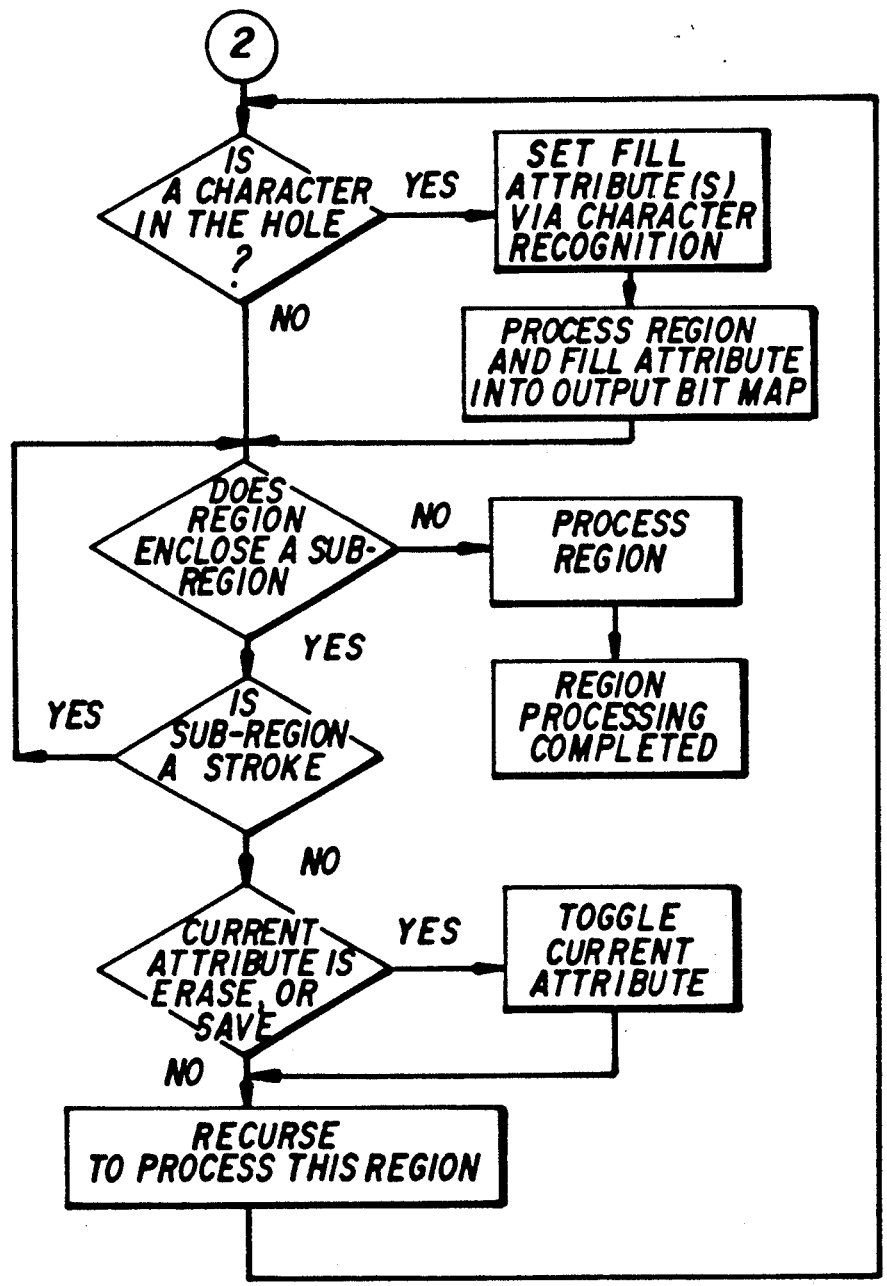
Figure 8:
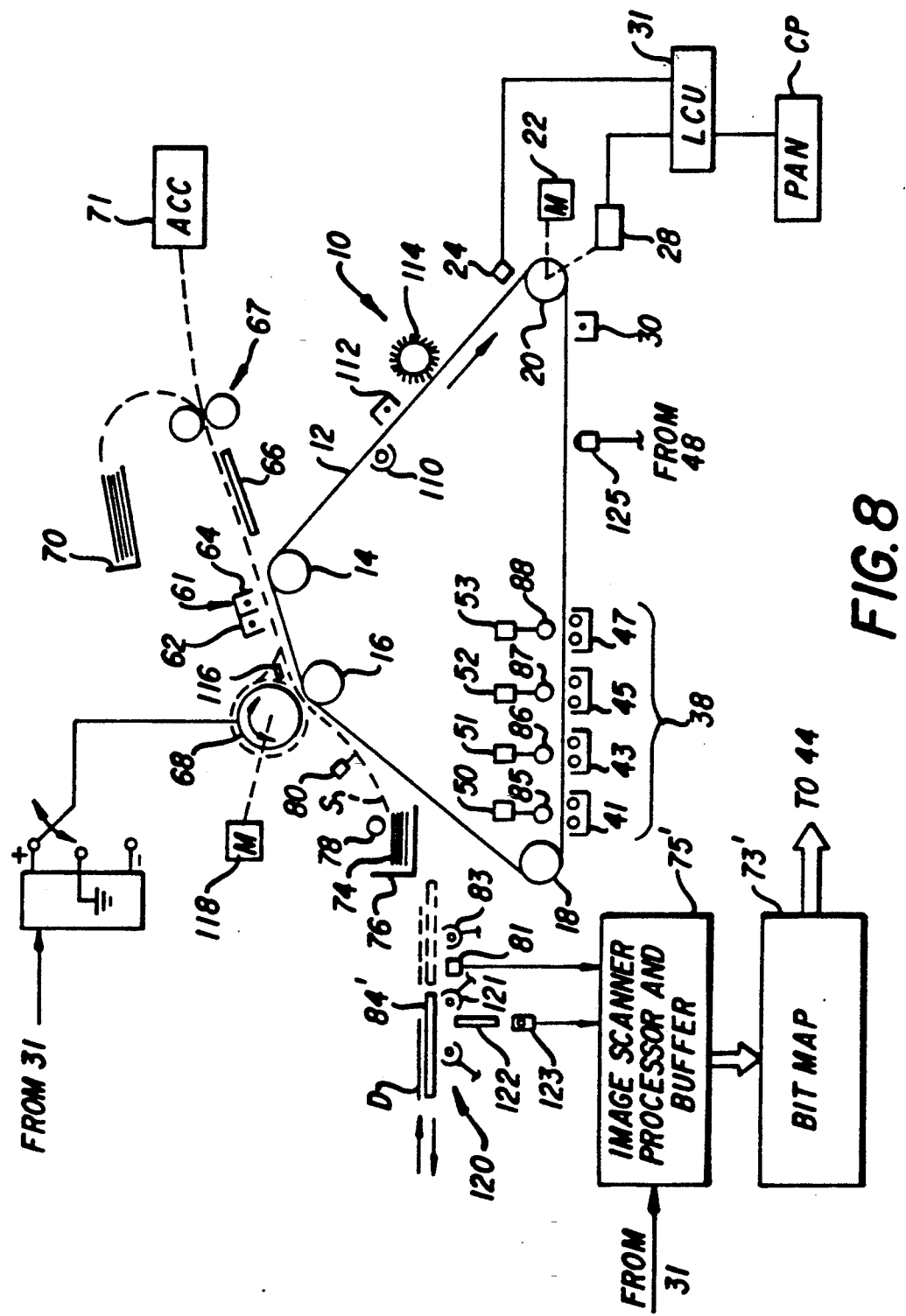
FIG. 8 is a similar view to that of FIG. 1a but of still another modified apparatus for practice of the present invention.

Additional methods and apparatus for exposure of an original sheet D are contemplated. For example, the image may be scanned and imaged upon the photoconductor using a scanning reflection exposure of the original, or by using light which has been electronically generated from, say, a data stream. In the former, segments of the original are scanned by a light source and the light modulated by the document is imaged upon the photoconductor. In the latter, as shown in FIG. 8, an image scanner 120 provides digitized image signals that modulate light directed upon the photoconductor. The selective erase function provided by a laser or an LED array or other suitable recorder could be incorporated into the electronic imaging device and accomplished electronically. A lamp 83 would illuminate the original D with a narrow beam of illumination during relative movement of the lamp and platen 84'. Sensor 81 detects all highlighting. The document is again scanned by, for example, the image scanning device 120 which includes lamps 121, gradient index lens array 122 and charge coupled device (CCD) array 123. All scanner output is processed by image scanner processor and buffer 75' and stored in the bit map 73' so that the bit map now contains (for each pixel) image information and highlight information stored in binary signal format. The information is conveyed to the LCU 31 and selected LED's on the LED exposure array 125 are illuminated to record only the information desired to be reproduced for each color according to the treatment mode indicated by the character coding. While separate scanning devices are shown in FIG. 5 the invention contemplates the use of a single scanner where in one mode the highlighting and character code may be read and in a second mode the image information on the entire document sheet may be read.

The LCU 31 supplies the image data and corresponding process control signals to the reproduction apparatus 10 as previously mentioned. For reproduction of the first image frame the LCU 31 actuates the LED array 125 (which may include a gradient index lens array not shown) through drivers 48 to only output the information to be reproduced in, for example, black. Similarly, signals from the LCU illuminate the LED array from bit map information for the second image frame to create a latent image for development of same in spot color.

However, the above embodiment of the present invention is contemplated as optionally including signal communications circuitry included in the output drivers 48 for supplying the digitized and processed image signals on a bidirectional communications bus to a remote image forming apparatus such as a printer 10' or another apparatus. Hence, the signal output from the image scanner processor and buffer 75' and bit map 73' may be selectably transmitted to another copier or a printer, display device, or suitable computing apparatus. For example, a scanned image may be processed and then supplied to a remote printing apparatus. Another example would be transmission of the document page to a remote printer to be merged into another document for subsequent printing on a linotype press. The signals for transmission may be prepared under the control of the central processing unit 33 for transmission on, for example, a local area network (LAN) or a modem and telephone line (not shown) that is connected to the output drivers 48.

The foregoing description of the reproduction process presumed that the original sheet was marked for red accent color. Other selectable machine treatment modes will now be described with reference to FIGS. 1a, 1b, and 8.

Selective Screen Mode

Character coding on the original document sheet may be used to designate areas to be selectively screened. The coordinates of the highlighted area may be processed and used to selectively illuminate an image of a halftone screen on the photoconductor in the area desired to be screened. A preferred way of accomplishing this is through use of a photoconductor having an integral screen as one of the layers thereof, as described in U.S. Pat. No. 4,294,536. In this mode (using the apparatus of FIG. 2) the first and second image frames on the photoconductor would both be exposed to all the information on the document sheet. The area to be screened would be selectively erased from the first image frame; the second image frame would have the non-screened areas selectively erased and then the entire frame exposed to a screen pattern. The two image frames would then be developed and transferred in register to the same surface of a receiver sheet or support. For providing the screen pattern, the illumination from an electroluminescent panel 126 from the rear of the photoconductor (opposite that which is developed) could also be used. Further details may be found in commonly assigned U.S. Pat. No. 4,794,421 filed in the name of Michael D. Stoudt et al; the content of which is also incorporated herein by this reference. Reference is also made to U.S. Pat. No. 4,740,818, filed in the name of Tsilibes et al for selective screening techniques requiring only the use of one image frame to reproduce a document with selective screening.

Erasure or Deletion Mode

In the deletion mode, the information highlighted is selected for erasure. Image transfer takes place using the developed information on the first frame which comprises the reproduction of the unhighlighted portions. The highlighted portions are selectively erased in accordance with the description above.

Combination of Modes

While the preferred embodiments have been described with regard to producing reproductions in two colors or providing a special treatment to a portion of information to be reproduced from an original, the invention also contemplates that more than one special treatment may be made to information in one area of an original or that different treatments may be provided to two or more areas. Thus, the programming of the logic and control unit 31 may accept combination or multiple treatment mode instructions from the image scanner and processor 75. Image Shift Mode.

A mode may be provided wherein a portion of an image may be reproduced in the same or a different color but shifted relative to the x (width) axis of the sheet D. In this mode, horizontal (x axis) image shift may be accomplished during the creation of the bit map during image processing at the image scanner processor 75'. (The horizontal image shift may also be accomplished by adjusting the timing determining the exposure location of one or more image frames, or by adjusting the timing of the movement of the receiver sheet into engagement with the photoconductor at transfer.) The image frames may be developed with different colored toners or the same color toner in accordance with the information input by the operator. Image shift on the apparatus shown in FIG. 8 may be accomplished using one image frame where the reproduction is to be developed in only one color. The shifting of the image information may be accomplished electronically by having the image scanner processor 75' recalculate the new location for placement of the highlighted information.

Other types of image shift are contemplated herein include duplexing wherein a simplex original may have the highlighted portion transferred to the backside of a support either in the same color or a different color from that transferred to the front side. Such duplexing may be accomplished using the means shown in FIG. 1a or the roller 68 and having this roller change direction of rotation to place the backside of the support in register with the second image frame. See, for example, U.S. Pat. No. 4,191,465.

Screen Tint Mode

Still another modification may be provided in which an area that is highlighted is desired to be overlaid with a screen tint to make it stand out on the page. In this case, an optical exposure is made of a first image frame and a second image frame is erased everywhere except for the highlighted area but no optical exposure of the original is made of this image frame. A back-lit screen is turned on to expose the second image frame to a level that will create a screen tint of any grey-level, say 15-20% and subsequently the two photoconductor image frames are toned either in the same colors or in different colors and transferred to the copy sheet. The result is a copy with designated areas covered with a tint screen and superimposed text or graphics.

Insertion and Chapterization Modes

Still other modifications may include the use of highlighting to assist in slip sheet insertion or chapterization. In slip sheet insertion, a separate tray is usually provided for storing sheets of desired colors for insertion at appropriate places into collated sets of copies. For example, assume the apparatus is being operated in a single color or black and white simplex-simplex reproduction mode. Also, assume that a simplex multisheet document original is placed as a stack in a tray that forms a part of a recirculating feeder RF (see FIG. 1b) for duplication in multiple collated sets. With the original document sheets image face-up, last sheet at the bottom, the documents may be advanced serially from the bottom of the tray, past the scanner 81, stopped at the exposure platen 84 for a single exposure and returned to the top of the document stack. Each document sheet is circulated a fixed number of times in accordance with the number of collated sets to be produced. Assume, now that through for example, a character code indicates that the apparatus is to be placed in an automatic slip-sheet insertion mode. In this mode the character code highlighting placed on any original document sheets that are interspersed within the stack of originals will be detected by the scanner 81 and will be used to actuate feeding of one of the colored sheets stored for this purpose in tray 138. The information on the highlighted sheet original is imaged on the photoconductor, developed and then transferred to one of the colored sheets. The colored sheets in this mode are fed to the accessory unit 72 where they are placed or stored in collated order with copies previously made on, for example, white bond paper from sheets stored in copy sheet supply tray 76.

In the chapterization mode, simplex originals are reproduced in duplex form and are required to have the first page of a new chapter start on the front of a new sheet and not be placed on the rear of the last page of the prior chapter. Thus, when the apparatus is placed in a chapterization mode by a respective character code, the duplex mode will be established and employ tray 138 as an intermediate storage tray. In this mode, tray 138 stores copy sheets that have each received an image on one surface after having been fed from tray 76 and are awaiting to be advanced to receive the image of the next original on the reverse side. Certain of the original document sheets in the stack provided in the recirculating feeder RF are also highlighted with respective character codes to indicate that either they are the last pages of respective chapters (for example, "L3" for last page of chapter 3) or that they are the first pages of respective chapters. The machine logic will be adjusted in accordance with one of these alternatives. As the original document sheets are circulated through the recirculating feeder for reproduction, a sheet with highlighting will be detected in this mode. Under control of the LCU 31, if this last page is an even number page of the chapter, the copy sheet reproducing this page is circulated back to the intermediate tray 138 for feeding therefrom for receipt of the image from this last page on the backside thereof. If this last page is an odd number, then the copy sheet upon which the image of the last page is formed will be sent to the accessory unit 72, or an output tray. Thus, machine set-up time is substantially reduced from the known practice of manually stepping each sheet through a simulated run to identify which sheets constitute the first page of a chapter.

Margin Shift Mode

Another modification may include the use of margin shift. Presently, margin shift is an option available on copier-duplicators wherein the operator provides inputs as to how much shift is desired and the timing of a advancement of the copy sheet is adjusted by the LCU according to the amount of shift desired. The use of margin shift is desired to ensure that information is not hidden in the bound area when a multisheet reproduction is bound or staped into a finished set. Since the desired margin is best determined from looking at the original, one may draw a respective character code and a vertical line down each original sheet to indicate where the margin for the information on the document is to be. A loop may be drawn on each original with a respectively different character code indicating the image to be margin shifted. The character codes thus have assigned functions so that the LCU is adapted to determine the necessary amount of shifting. The timing of copy sheet advancement is adjusted to provide desired margin shifts.

In many applications it is desirable in a single production job to have some sheets of a multisheet document original be reproduced with portions thereof selectively erased, some sheets reproduced with accent color and the feature(s) of chapterization and/or slip sheet insertion also employed. The apparatus and method of the invention lends itself quite well to this objective for automatically producing finished sets having multi-requirements. With the addition of a conventional recirculating document feeder RF and extra supply trays for providing slipsheet insertion a highly productive copier-duplicator is provided for producing finished sets. As is known, duplex copies may be produced on this apparatus by having roller 68 remove a copy sheet from the web 12 after one image is transferred to the sheet and then have the roller reverse its direction of rotation with diverter 116 moved to peel the sheet from roller and direct same into alignment with the image frame reproducing the next image for transfer of this image onto the backside of the copy sheet.

Sheet Renumbering Mode

In certain production jobs it is desired to renumber documents when reproducing a multisheet document original. This can be accomplished in the apparatus of FIGS. 1a and 1b by having a darkened area covered with highlighting material or surrounded by same placed on each original document sheet where a number is to be reproduced on its corresponding reproduction. As each original is reproduced serially (preferably by using a recirculating feeder), when the document sheet is exposed onto an image frame, an area of charge is preserved on the image frame that corresponds to this darkened area. Since the location for this area on the image frame is known by the image processor 75, the LCU 31 in its stored program control 36 will have a character generator for generating signals that relate to numbers in a count order. The count order (the page numbering that appears on the reproduction) may be specified by a highlighted character placed at the location to be numbered. Alternatively, this count order may be entered by the operator through the keyboard (e.g., for page numbering sequences of various types, such as even, odd or non-sequentially ordered numbers.) Or, the count order may simply correspond to the number of originals in the original document stack. In a recirculating feeder of the type described, the last sheet is copied first. The LCU may actuate the LED's to expose a different number upon each of the preserved charge areas on each image frame. Thus, the developed image frames provide a finished numbered set of sheets that have the numbers provided by the copier-duplicator apparatus.

Alternative Highlighting Materials, Instruments, and Modes

The highlighting material may be composed of any one of a variety of compositions which, when present on or in a sheet D, are detectable by a corresponding detection means. In addition to the preferred UV-active ink, such compositions would be characterized as (but not limited to) those exhibiting reflective, conductive, magnetic, radioactive, dielectric, charged (ionic), or polarizing attributes. The respective detector may simply sense the presence of the highlighting material, or may stimulate the highlighter to respond with a predetermined, characteristic "signature".

Thus, while the invention has been described with regard to a highlighting ink that may be detected through light sensing means, other types of non-optical highlighting material may be used, including a transparent magnetic ink useable with magnetic readers detecting same. The ink may be placed on the "backside" of a sheet and thus need not be transparent when so placed. When the highlighting ink is placed on the backside, the positions of the sensor 81 and source 83 would be adjusted so as to be in position to read the backside of the sheet. The scanner 81 and source 83 may then be positioned to read the backside of the sheet to determine the location of the area to be specially treated. This may permit for a better signal to noise ratio.

A further alternative is to permit for selectable reading of the frontside or the backside. Where, for example, a recirculating document feeder is used to circulate document sheets serially from the bottom of a stack supported in the tray to the exposure platen and back to the tray at the top of the stack, the source 83 and scanner 81 may be located just downstream of the vacuum feeder feeding the sheets from the bottom of the tray. The tray in such a feeder is usually located above the exposure platen, see for example, U.S. Pat. No. 4,451,137 (Farley), the contents of which are incorporated by this reference. Where the sheets are stacked image face up, the scanner 81 will be used to read the image face for highlighting before each sheet is fed to the exposure platen for exposure and then returned to the tray. When a mode is selected for reading the backside of each sheet, the stack of sheets will be placed in the tray image side down with the first sheet of the multisheet document at the bottom of the stack. The sheets will be driven serially from the bottom of the stack and read by the scanner 81.

To be in proper position for exposure, the sheets need to be not inverted by the vacuum feeder. One approach is to divert the sheets image face down to a conventional sheet direction reversing device which does not turn the sheet over but merely receives it while the sheet is moving in one direction and reverses its drive rollers to move the sheet in a different direction. In this example, a document positioner such as shown in Farley (U.S. Pat. No. 4,451,137) may have the sheet directed thereto image side down and then be actuated to drive the sheet onto the exposure platen. After exposure a similar sheet direction reversing drive may be used to receive the sheets serially from the exposure platen and return them to the top of the tray with the image side facing down.

As described above, the highlighting material may be applied simply with a felt-tip pen or other writing instrument to create both the closed loop and the character. Alternatively, the character may be applied with a preconfigured device, such as a rubberized ink stamp, such that the character impressed on the sheet D has a standarized shape. Such pre-configuration of the character increases the machine-readability of the character and reduces the chance of a false or erroneous reading. Preconfiguration may be useful for character coding in some complex alphabets, such as kanji. The preconfigured device also is a handy labor-saving device for the operator who must repetitively highlight many sheets, or who may not remember all of the various characters available in the library. In this sense the preconfigured device could include a listing thereon of the character(s) available (or selectable) for impression by that device. Several characters could be successively selected or combined by adjustment of an appropriate mechanism on one such device, as is known in the art. In the preferred embodiment, the ink stamp is wetted with a quantity of highlighting ink when impressed upon a conventional ink pad that has been infused with the UV-active highlighting ink.

Furthermore, the highlighting according to the present invention is contemplated as encompassing alternative methods and apparatus for conditioning or altering the sheet in still other machine-readable fashions. Such apparatus may moisten, compress, perforate, texture, score, or striate certain areas of the original sheet at selectable locations thereon. Such alteration is contemplated as being quite minimal (and typically invisible to the unaided eye) so as to preserve the readability of the original information.

The highlighting method and apparatus as contemplated herein is amenable to automation and may be incorporated in any document-processing machinery. Thus the highlighter is not limited to a handheld device but would include, for example, an automated highlighting material applicator that is moved by a servo-controlled positioner as is known in the art. Such an automated highlighter could be included in a paper cutting or punching device, or in a more complex device, such as a printing or lithographic press, color copier, facsimile machine, or other imaging device.

For example, a conventional production line is often used to print stationery (letterhead) or other paper products with a distinctive, colored logo. An automated highlighter may be inserted in the stationery production line such that the logo on each sheet of the letterhead is quickly highlighted and character-coded for spot-color reproduction of the logo. Any subsequent reproduction of the sheet by the appropriate apparatus 10 would automatically provide the logo in the original, distinctive color as spot color. No operator intervention at either the sheet production or reproduction stages would be necessary. As another example, a certain areas of a document sheet generated by a copier could be automatically highlighted to place a logo in a respective color composition. The copy, when reproduced later, would be reproduced automatically and accurately with the special logo in spot color in the appropriate area. Other distinctive areas on an original could similarly be made to retain their distinctive character. For example, the photographic portions of an original sheet could be automatically coded for half tone reproduction. When that original is used in an apparatus according to the present invention, the photographs would automatically be reproduced in half-tone.

In the foregoing examples, a reproduction would automatically retain any character-coded spot color or other special characteristics, even though the operator of the reproduction apparatus was unaware or uninterested in the character coding. However, the automated highlighter could be used to encode an original at other areas and for other reasons. As the highlighter may optionally be invisible to the unaided eye, the highlighting and character-coding could be automatically be placed on portions of an original that are considered confidential (i.e., non-reproducable) or for distribution to certain users. The character could be an alphanumeric combination that would prevent reproduction of that portion unless the respective apparatus was appropriately programmed. In some applications, this arrangement would provide document control in the office environment, i.e., the distribution of copies to various units of a business. A portion of an original may be intended for certain readers in, for example, the marketing department of a large business. That portion would be appropriately highlighted and character coded (with "M", for example). If desired, other portions of the same original may be highlighted and coded for readers in, for example, the financial planning department ("FP"). Yet the one original could be circulated through all business departments, and each department would be able to generate a copy that is customized or specific to that department.

The invention has been described with regard to the application of highlighting material or sheet alteration directly upon the document sheet being reproduced. In a modification of the method and apparatus of the invention, the highlighting may be applied or directed to a transparent sheet that has been overlaid upon the document sheet. In this modification, the overlay and document sheet comprise the document sheet to be reproduced when exposed together. The document sheet and the transparent sheet may also be read successively by an electronic image reading device and the special treatment provided during the reproduction process in accordance with signals generated in response to the markings on the transparent sheet without reproduction of the markings on the transparent sheet.

The invention has been described in detail with particular reference to the preferred embodiments thereof, but it will be understood that variations and modifications can be effected within the spirit and scope of the invention.

What is claimed is:

1. A method for providing document image information from a document sheet for reproduction of the information with special treatment to at least one selected image area, the selected area having a boundary and at least one alphanumeric character code associated therewith, the boundary and the character code being composed of a fluorescent ink composition having a detectable spectral emission characteristic, the character code being indicative of the special treatment, comprising the steps of:

scanning the document sheet;

detecting the alphanumeric character code and the boundary and providing respective output signals; and processing the output signals to produce a first signal set indicative of the location of the selected image area and a second signal set indicative of the special treatment to be applied to the selected image area.

2. The method according to claim 1 further comprising the step of reproducing the image information with special treatment to the selected image area according to the first and second signal sets.

3. Apparatus for providing document image information from a document sheet for reproduction of the information with special treatment to at least one selected image area therein, comprising:

means for providing a boundary of a highlighting material on the sheet to indicate the selected image area, said highlighting material comprising a UV-active ink having a detectable spectral emission characteristic;

means for providing an alphanumeric character formed from the highlighting material, at a position on the sheet associated with the selected area, to specify the special treatment;

means for scanning the document sheet;

means for detecting the character code and the boundary and providing respective output signals; and means for processing the output signals to produce a first signal set indicative of the location of the selected image area and a second signal set indicative of the special treatment to be applied to the selected image area.

4. The apparatus according to claim 3 and further comprising means for reproducing the image information with special treatment to the selected image area according to the first and second signal sets.

5. A method for reproducing a portion of image information present upon a document sheet, said portion being located either in a first area between a first loop of ink and a second loop of ink located within the first loop, or in a second area located within the second loop; said method comprising the steps of:

scanning the document sheet for the presence of the ink and generating respective output signals upon detection of same;

processing the output signals to produce signal sets representing the boundaries of the first and second loops; and reproducing upon a recording sheet, in response to said signal sets, the portion of the image information in one of said two areas while not reproducing image information within the other.

6. The method of claim 5 and wherein there is reproduced upon the recording sheet information located on said document sheet outside of said first loop and information located within said second loop.

7. A method for reproducing a portion of image information present upon a document sheet in a color different than the original, said portion being located either in a first area between a first loop of ink and a second loop of ink located within the first loop, or in a second area located within the second loop; said method comprising the steps of:

scanning the document sheet for the presence of the ink and generating respective output signals upon detection of same;

processing the output signals to produce signal sets representing the boundaries of the first and second loops; and in response to said signal sets reproducing upon a recording sheet the portion of the image information in one of said two areas in a color different than the original while reproducing image information within the other in the same color as the original.

8. An apparatus for reproducing a portion of image information present upon a document sheet, said portion being located either in a first area between a first loop of ink and a second loop of ink located within the first loop, or in a second area located within the second loop; said apparatus comprising:

means for scanning the document sheet for the presence of the ink and generating respective output signals upon detection of same;

means for processing the output signals to produce signal sets representing the boundaries of the first and second loops; and means responsive to said signal sets for reproducing upon a recording sheet the portion of the image information in one of said two areas while not reproducing image information within the other.

9. The apparatus of claim 8 and wherein the reproducing means reproduces upon the recording sheet information located on said document sheet outside of said first loop and information located within said second loop.

10. An apparatus for reproducing a portion of image information present upon a document sheet in a color different than the original, said portion being located either in a first area between a first loop of ink and a second loop of ink located within the first loop or in a second area located within the second loop; said apparatus comprising:

means for scanning the document sheet for the presence of the ink and generating respective output signals upon detection of same;

means for processing the output signals to produce signal sets representing the boundaries of the first and second loops; and means responsive to said signal sets for reproducing upon a recording sheet the portion of the image information in one of said two areas in a color different than the original while reproducing image information within the other in the same color as the original.

11. Apparatus for reproducing image information from a document sheet with special treatment to at least one selected image area bounded by a primary loop of a highlighting material and identified by at least one alphanumeric character code composed of the highlighting material and indicative of the special treatment, said primary loop enclosing a non-primary loop bounding an image area that is not to receive special treatment comprising:

means for scanning the document sheet;

means for detecting the boundaries of said primary and non-primary loops and the alphanumeric character code to produce a first signal set;

means for processing the first signal set to produce a second signal set specifying the selected image area and the special treatment to be applied; and means for reproducing the image information with special treatment to the selected image area according to the second signal set.

12. The apparatus according to claim 11 and further comprising:

means for digitizing the image information;

means for creating a bit map which represents the digitized image information with the selected area adjusted by the special treatment; and means for retaining the bit map for use in the reproduction of the image information.

13. The apparatus according to claim 12 and wherein the reproduction means further comprises means for communicating the bit mapped image information to a remote image-forming apparatus.

14. The apparatus according to claim 11 and wherein the reproducing means further comprises:

means for imaging the image information from the document sheet upon a charged image-bearing member;

means for adjusting the charge corresponding to the selected image area according to the second signal set; and means for developing the resulting adjusted image.

15. The apparatus according to claim 14 and further comprising means for transferring the developed image to a support.

16. The apparatus according to claim 15 and wherein the adjustment means further comprises means for erasure of the selected image area from the image-bearing member.

17. The apparatus according to claim 15 and wherein the adjustment means further comprises means for formation of a halftone screen pattern on the image-bearing member.

18. The apparatus according to claim 15 and wherein the reproducing means further comprises means for shifting the selected image area relative to the remaining image information as compared with the respective position of the selected image area on the document sheet.

19. The apparatus according to claim 14 and wherein the imaging means provides image information onto each of two image frames and the adjustment means selectively erases the selected image area from one image frame and the image information complementary to the selected image area from the other image frame.

20. The apparatus according to claim 19 and further comprising means for developing the image frame containing selected image area and the image frame containing the complementary image information with different colored toners and means for transferring the developed colored images in register to a support.

21. The apparatus according to claim 19 and wherein the reproducing means exposes the selected image area of the other image frame to a halftone screen pattern.

22. The apparatus according to claim 19 and wherein the reproducing means exposes the selected image area of the other image frame to a back-lit screen at an exposure level to provide a grey-level screen-tint.

23. A method for reproducing document image information from a document sheet with special treatment to at least one selected image area, comprising:
    providing multiple loops of highlighting to define selected image areas which are not to receive special treatment within a loop defining an image area which is selected to receive special treatment;
    providing at a position associated with the image area which is selected to receive special treatment at least one alphanumeric character code formed from the highlighting and indicative of the special treatment;
    scanning the document sheet;
    detecting the highlighting and generating signals in response thereto;
    processing the signals related to the detected highlighting to produce a set of signals indicative of both the selected image area which is to receive special treatment and the special treatment to be applied thereto; and
    reproducing the image information with special treatment to the image area which is selected to receive special treatment according to the set of signals.

24. The method according to claim 23 and wherein the processing step further comprises the steps of:
    generating signals indicative of the alphanumeric character; and in response to these generated signals,
    translating these character indicating signals to provide a treatment mode specific to these signals.

25. The method according to claim 24 and wherein the character code represents a combination of special treatments to be applied.

26. The method according to claim 23, 24, or 25 and wherein the area is defined by a boundary comprising a loop of the highlighting material which encloses the selected area.

27. The method according to claim 23 and wherein the highlighting is composed of magnetic ink.

28. The method according to claim 23 and wherein the highlighting is composed of a fluorescent ink.

29. The method according to claim 23 and wherein the step of providing the character code is performed using a preconfigured device.

30. The method according to claim 23 and wherein the steps of providing a boundary and a character code are performed with the use of automated instruments.

31. The method according to claim 23 and wherein the steps of providing multiple loops and a character code are performed by selectively altering the structure of the document sheet in a machine-readable fashion.

32. The method according to claim 23 and further comprising the steps of:
    digitizing the image information;
    creating a bit map which represents the digitized image information with the selected area adjusted by the special treatment; and
    retaining the bit map for use in the reproduction of the image information.

33. The method according to claim 32 and wherein the reproducing step further comprises the step of communicating the bit mapped image information to a remote image-forming apparatus.

34. The method according to claim 23 and wherein the reproducing step further comprises:
    imaging the image information from the document sheet upon a charged image-bearing member;
    adjusting the charge corresponding to the image area indicated by the highlighted area in accordance with the signals generated to indicate same; and
    developing the resulting adjusted image.

35. The method according to claim 34 and further comprising the step of transferring the developed image to a support.

36. The method according to claim 35 and wherein the step of adjusting comprises the erasure of the corresponding image area from the image-bearing member.

37. The method according to claim 35 and wherein the step of reproducing comprises the formation of a halftone screen pattern on the image information on the image-bearing member.

38. The method according to claim 35 and wherein the step of reproducing comprises shifting the selected image area relative to the remaining image information as compared with the respective position of the selected image area on the document sheet.

39. The method according to claim 34 and wherein the image information is imaged onto each of two image frames and the selected image area is not reproduced from one image frame but is reproduced from the other image frame, and the image information complementary to the selected image area is not reproduced from the other image frame but is reproduced from the one image frame.

40. The method according to claim 39 and wherein the image frame reproducing the image of the selected image area and the image frame reproducing the image of the complementary image information are developed with different colored toners and the developed colored images are transferred in register to a support.

41. The method according to claim 39 and wherein the adjustment step further comprises the erasure of the selected image area from the one image frame.

42. The method according to claim 39 and wherein the reproducing step further comprises the exposure of the image frame reproducing the selected image area to a halftone screen pattern.

43. The method according to claim 39 and wherein the reproducing step further comprises the exposure of the image frame reproducing the selected image area to a back-lit screen at an exposure level for provision thereupon of a grey-level screen-tint image area.

* * * * *